US011023014B2

(12) United States Patent
Park et al.

(10) Patent No.: US 11,023,014 B2
(45) Date of Patent: Jun. 1, 2021

(54) ORIENTATION SPECIFIC CONTROL

(71) Applicant: Microsoft Technology Licensing, LLC, Redmond, WA (US)

(72) Inventors: Daniel C. Park, Woodinville, WA (US); Karsten Aagaard, Monroe, WA (US); Nishant Srinivasan, Seattle, WA (US); Benoit Guillaume Henri Rouger, Woodinville, WA (US); Michael Schweers, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 670 days.

(21) Appl. No.: 15/869,602

(22) Filed: Jan. 12, 2018

(65) Prior Publication Data

US 2019/0220064 A1 Jul. 18, 2019

(51) Int. Cl.
*H05K 7/00* (2006.01)
*G06F 1/16* (2006.01)
*G06F 1/3206* (2019.01)
*G06F 1/3287* (2019.01)

(52) U.S. Cl.
CPC .......... *G06F 1/1677* (2013.01); *G06F 1/1616* (2013.01); *G06F 1/1684* (2013.01); *G06F 1/3206* (2013.01); *G06F 1/3287* (2013.01)

(58) Field of Classification Search
USPC ....................................................... 361/729
See application file for complete search history.

(56) References Cited

U.S. PATENT DOCUMENTS

| 6,559,399 | B2 | 5/2003 | Hsu et al. | |
|---|---|---|---|---|
| 6,929,291 | B2 * | 8/2005 | Chen | E05C 19/16 |
| | | | | 292/251.5 |
| 7,382,357 | B2 | 6/2008 | Panotopoulos et al. | |
| 8,355,250 | B2 * | 1/2013 | Yu | G06F 1/1616 |
| | | | | 361/679.58 |
| 8,363,407 | B2 | 1/2013 | Yamamoto et al. | |
| 8,391,935 | B2 | 3/2013 | Wickman et al. | |
| 9,134,760 | B2 | 9/2015 | Hinckley | |
| 9,651,995 | B2 | 5/2017 | Zeng et al. | |
| 9,684,394 | B2 | 6/2017 | Foss et al. | |
| 2003/0011972 | A1 * | 1/2003 | Koo | G06F 1/1616 |
| | | | | 361/679.27 |
| 2004/0233627 | A1 | 11/2004 | Anderson et al. | |
| 2006/0053313 | A1 | 3/2006 | Lodolo et al. | |
| 2006/0090090 | A1 | 4/2006 | Perng | |
| 2008/0212272 | A1 | 9/2008 | Hollander | |

(Continued)

OTHER PUBLICATIONS

"International Search Report and Written Opinion Issued in PCT Application No. PCT/US2018/067771", dated Mar. 28, 2019, 12 Pages.

*Primary Examiner* — Hung S. Bui
(74) *Attorney, Agent, or Firm* — Rainier Patents, P.S.

(57) ABSTRACT

The description relates to orientation specific control of computing devices. One example can include an orientation specific actuator for controlling functionality of a computing device. The example can include providing a first functionality related to a first orientation of the computing device in response to engagement of the orientation specific actuator. The example can also include providing a second functionality in response to engagement of the orientation specific actuator in a second orientation of the computing device.

20 Claims, 5 Drawing Sheets

(56) References Cited

U.S. PATENT DOCUMENTS

| | | |
|---|---|---|
| 2014/0282055 A1 | 9/2014 | Engel et al. |
| 2016/0187923 A1 | 6/2016 | Zeng et al. |
| 2019/0164675 A1* | 5/2019 | Srinivasan ............ G06F 1/1679 |

* cited by examiner

FIG. 5A  CLOSED ORIENTATION

FIG. 5B  OPENED ORIENTATION

FIG. 5C  OPENED ORIENTATION

ORIENTATION SPECIFIC CONTROL

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 2A-5C show sectional views of example devices in accordance with some implementations of the present concepts.

DESCRIPTION

The present concepts relate to orientation specific control of a device. In some implementations, different functionality for controlling the device can be accessible depending on an orientation of the device, such as a closed or an opened orientation. An example device can be a foldable computing device. Engaging an orientation specific actuator (e.g., a button) of the device while the device is in a closed orientation (e.g., folded together) can effect a first range of functionality. However, when an orientation of the device changes, the functionality accessible via the same orientation specific actuator can also change. For example, when the device is in an opened orientation, engaging the same orientation specific actuator can effect a second, different range of functionality. As such, orientation specific control concepts can provide increased flexibility for components of a device and/or simplify the user experience.

Figure 1A:
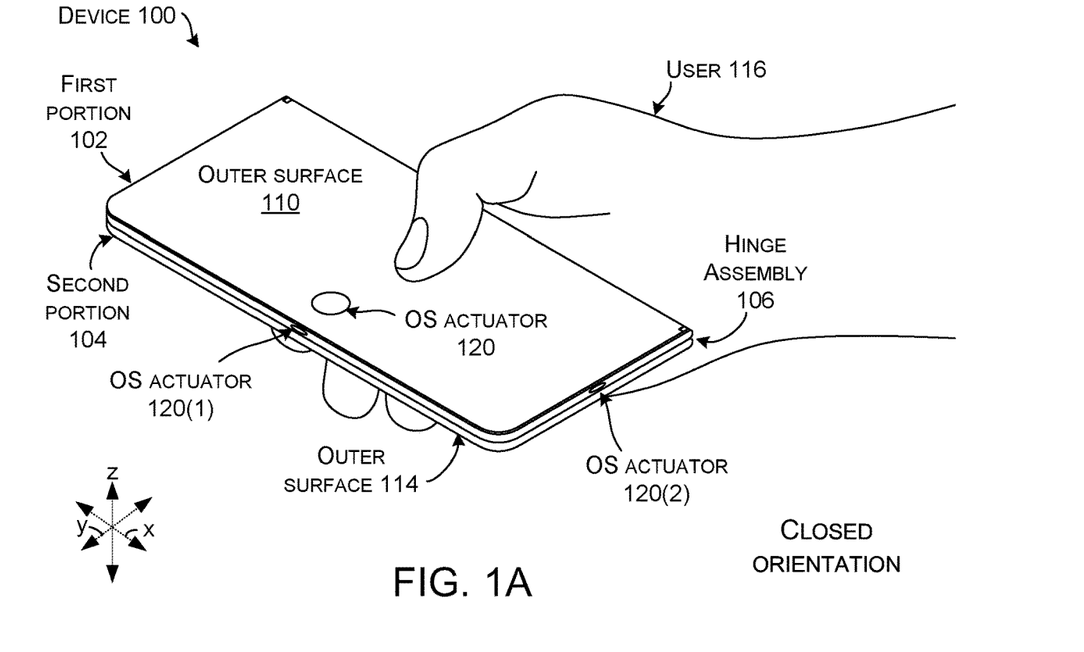
FIGS. 1A-1C show perspective views of an example device in accordance with some implementations of the present concepts.
Figure 1B:
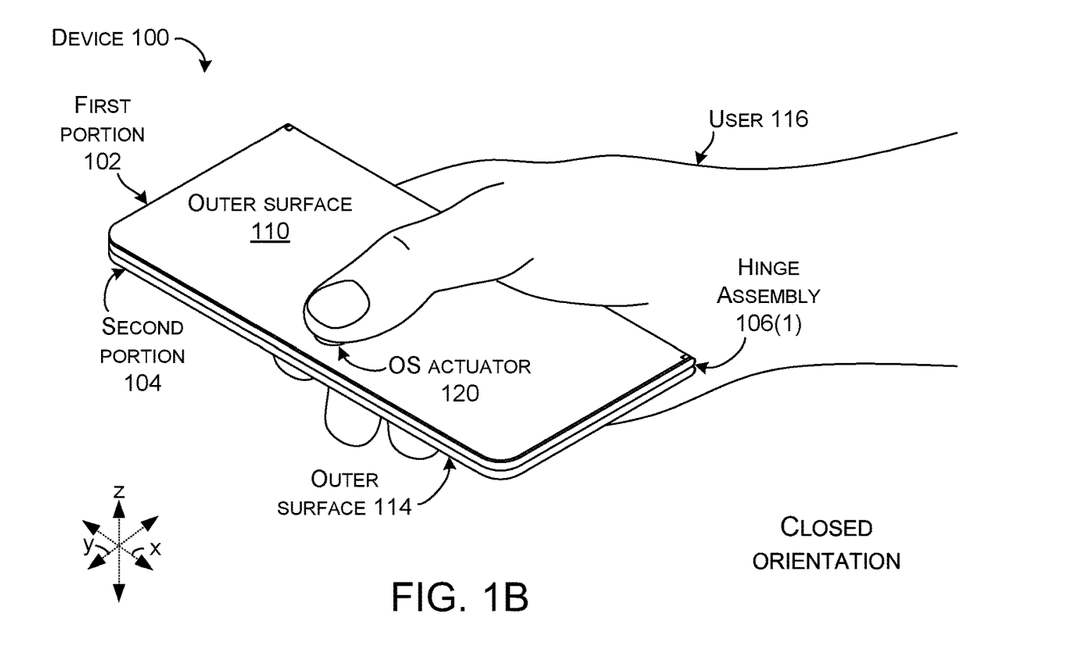
Figure 1C:
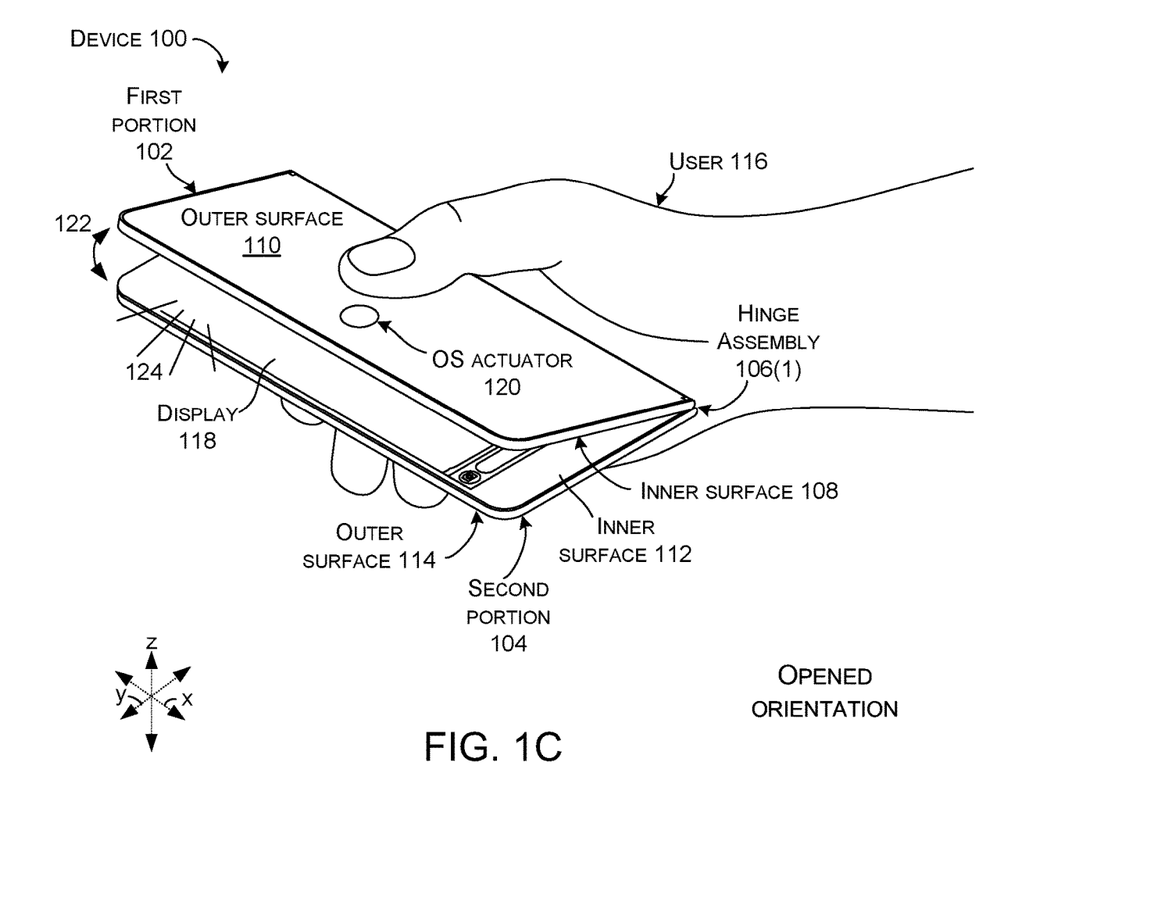

Introductory FIGS. 1A through 1C collectively show a use case scenario of an example device 100. Device 100 has first and second portions 102 and 104 that are rotatably secured together by a hinge assembly 106. The hinge assembly 106 can provide a rotational range of the first and second portions 102 and 104 from zero degrees to 360 degrees, for instance. In some implementations, device 100 can be a handheld computing device, such as a smart phone type device. First portion 102 can have an inner surface 108 and an outer surface 110. Second portion 104 can also have an inner surface 112 and an outer surface 114. (Note the inner surface 108 and outer surface 114 are facing away from the viewer in FIGS. 1A through 1C and as such are not directly visible). Device 100 can be held by a user 116. Device 100 may also include one or more displays 118.

Device 100 can have an orientation specific actuator 120. In FIG. 1A, alternative locations for the orientation specific actuator 120 are shown, including orientation specific actuators 120, 120(1), and 120(2). The example locations are not meant to be limiting, other locations of the orientation specific actuator on device 100 are contemplated. In FIGS. 1B and 1C, one location of the orientation specific actuator 120 is shown to avoid crowding on the drawing page.

FIG. 1A depicts device 100 in a closed orientation, where the inner surfaces 108 and 112 of the first and second portions 102 and 104 are positioned parallel to and against one another (e.g., overlay one another). In this case, the outer surfaces 110 and 114 are facing outwardly, with the first portion's outer surface 110 facing the reader and the second portion's outer surface 114 facing the fingers of the user 116. The closed orientation can be very compact and easy for the user to transport. For instance, the device may fit in the user's pocket. Further, the inner surfaces can be protected in this closed orientation by the outer surfaces.

In this implementation, the orientation specific actuator 120 of the device 100 can provide a first functionality from the closed orientation. Examples of the first functionality can include causing the device 100 to open and/or powering up (e.g., turning on, waking from a sleep mode) the device.

Assume at this point the user 116 wants to use the device 100. For instance, the user may want to be able to view display 118. As shown in FIG. 1B, the user 116 can simply engage the orientation specific actuator 120 to open the device. Engagement of the orientation specific actuator 120 by the user 116 can be accomplished with or without depressing the orientation specific actuator. For example, in some cases the user can simply rest a finger or thumb on the orientation specific actuator 120 for engagement, without pushing and/or changing a height of the orientation specific actuator relative to the device 100. In other cases, the user can depress the orientation specific actuator 120 toward the device 100 for engagement.

As shown in FIG. 1B, the user can engage the orientation specific actuator 120 with a single digit (in the illustration his/her thumb) to activate the orientation specific actuator, releasing the first and second portions 102 and 104 and causing the device to open. In this case, the first functionality can also include powering up the device. For example, continued actuation of the orientation specific actuator 120 can cause the device to power up. Stated another way, a single user action of engaging the orientation specific actuator can both open the device and power up the device.

As shown in FIG. 1C, responsive to the user 116 engaging the orientation specific actuator 120, the device 100 has both transitioned to an opened orientation as indicated at 122 and powered on the display 118 (e.g., lighted the display) as indicated at 124. In the opened orientation, the first and second portions 102 and 104 are rotated apart from one another, such that the first and second portions are no longer parallel to and/or against one another. In FIG. 1C, the lighted display 118 and the inner surface 112 of the second portion 104 are at least partially visible.

Once the device 100 is in the opened orientation, the orientation specific actuator 120 can provide a second functionality. For example, engagement of the orientation specific actuator in the opened orientation by the user 116 can cause the device to power on, power off, go to sleep, or wake up (i.e., similar to a power/sleep/wake "function" button). Note that in this implementation, the functionality provided by the orientation specific actuator 120 (e.g., accessible functionality) is automatically determined by the orientation of the device and does not require any additional user action. For instance, if the device 100 is in an opened orientation and the user engages the orientation specific actuator 120, the device can power up. If the device is in a closed orientation and the user engages the orientation specific actuator, the device can both open and power up. Thus, the orientation determines the functionality provided by the orientation specific actuator rather than simply alternating between a first functionality and a second functionality, for example. Stated another way, if the device is closed, but for some reason opens up (e.g., manually opened by the user without engaging the orientation specific actuator, lock failure, etc.), the functionality provided by the orientation specific actuator is determined by the orientation. In this instance, the button height can also change automatically to provide an indication to the user of the available functionality.

To conclude the illustrated use case scenario, assuming user 116 is done using the device 100, the user can close the device simply by pressing the first and second portions 102 and 104 together until the inner surfaces 108 and 112 are against one another and the device is closed. The device has then returned to the closed orientation as shown in FIG. 1A, and thus the first functionality associated with the closed orientation would again be provided through engagement of the orientation specific actuator 120.

As described in the use case scenario above, a single orientation specific actuator (e.g., button) can be used to effect different functionalities. Traditionally, different buttons on computing devices are tied to different specific functions. For instance a first button is utilized to lock and unlock a computing device, while a second button is used to control a power state of the computing device. Further, the different buttons generally perform the specific functions irrespective of an orientation of the computing device. However, the different buttons can increase the complexity of a device, confusion for a user, cost in manufacturing, and/or chances for mechanical failure. In contrast, being able to automatically access multiple different functionalities from a single orientation specific actuator simplifies a computing device and its use for a user. Some additional examples of different functionalities provided by a single orientation specific actuator are described below with reference to FIGS. 1B and 1C.

Referring again to FIG. 1B, in addition to opening the device 100 and powering up the device, the first functionality can include unlocking the device, identifying a particular user of the device (e.g., finger/thumbprint identification), and/or lighting the display 118, among other mechanical and/or electrical functionalities. For instance, engagement of orientation specific actuator 120 by the user 116 can cause a lock within the first and/or second portions 102 and 104 to unlock, releasing the device to the opened position. (This aspect is described in more detail below relative to FIGS. 2A through 3B.) Continuing in reference to FIG. 1B, engagement of the orientation specific actuator 120 by the user 116 with their thumb can result in thumbprint identification of the user that can be necessary for the lock to release, can cause the device to power on, and additionally or alternatively can cause the display to light up. As such, the single orientation specific actuator 120 can automatically provide multiple useful functions to the user from the closed orientation.

Furthermore, the single orientation specific actuator 120 can automatically provide a different range of functionality simply based on the device 100 being in the opened orientation, as in FIG. 1C. The second functionality provided in the opened orientation can be a subset of the first functionality, or can be different. In addition to powering up/down the device 100, in some implementations the second functionality can include lighting the display 118 (e.g., 124) and changing a power state of the device, among other mechanical and/or electrical functionalities. Therefore, from the opened orientation shown in FIG. 1C, if the user wanted to save battery life of device 100 for example, the user 116 could engage the orientation specific actuator 120 to cause the device to go into a sleep mode. The examples of first and second functionalities given here are not meant to be limiting. In some cases an order of the example first and second functionalities described in the use case scenario for FIGS. 1A through 1C can be generally reversed. For example, the first functionality can include the device 100 powering up, and the second functionality can include the device opening.

In some cases, the particular functionality provided by orientation specific actuator 120 can be at least partially dependent on a current state (e.g., current power state) of device 100. A current power state of the device 100 can include powered off, powered on, and/or a sleep mode. For example, where the device 100 is in the opened orientation and a current power state of the device is powered off, engagement of the orientation specific actuator 120 can cause the device to be powered on. However, where the device 100 is in the opened orientation and a current power state of the device is powered on/awake, engagement of the orientation specific actuator 120 can cause the device to be powered off, or enter a sleep mode. Other factors affecting the functionality provided by the orientation specific actuator 120 are considered, such as user 116 holding the orientation specific actuator 120 down (e.g., depressed) briefly, as opposed to quickly "clicking" the orientation specific actuator. For instance, in some cases holding the orientation specific actuator 120 down can power the device 100 off from a powered on state, while clicking the orientation specific actuator 120 can place the device in sleep mode.

To assist in understanding how the orientation specific actuator 120 can automatically provide different functionalities from different orientations, it can be helpful to view the closed orientation of device 100 (FIG. 1A) as corresponding to a first stage of the orientation specific actuator 120, and the opened orientation of device 100 (FIG. 1C) as corresponding to a second stage of the orientation specific actuator. In some cases, the first and second stages of the orientation specific actuator 120 can correspond to different strokes available to the user that in turn effect which functionality the orientation specific actuator provides. For instance, when the device is in the closed orientation shown in FIG. 1B, the user 116 may be able to depress the orientation specific actuator 120 a particular distance (e.g., stroke). However, when the device is in the opened orientation shown in FIG. 1C, the distance/stroke that the user 116 is able to depress the orientation specific actuator 120 may be different than from the closed orientation. Stroke differences of the first and second stages of the orientation specific actuator 120 will be described in more detail below, relative to FIGS. 2A through 3B.

In some implementations, the first and second stages of the orientation specific actuator 120 can be associated with indicators to the user 116 of the type of functionality available. Subtle indicators can enhance the user experience by helping the user 116 anticipate what will happen when the user engages the orientation specific actuator 120. In some cases, orientation specific actuator 120 can provide a tactile indicator, such that by feeling the orientation specific actuator the user can tell what functionality will ensue. For example, orientation specific actuator 120 can have a difference in height between the first and second stages relative to a surface of the device 100 (described below relative to FIGS. 2A through 3B). Other indicators of the first and second stages and/or indicators of changes in functionality provided by the orientation specific actuator 120 are contemplated, including sound, light, and vibration. For example, the device 100 can produce an audible sound when transitioning from the first to the second stage, and/or when closing the device.

From one perspective, orientation specific control concepts can simplify a computing device by reducing a number of required components. As described above relative to FIGS. 1A through 1C, a single orientation specific actuator 120 can automatically provide multiple different functionalities, and the range of different functionalities can change depending on a current orientation of the device, expanding the flexibility and usefulness of the orientation specific actuator 120. Furthermore, the user experience can be simplified by reducing a number of components the user must navigate, and potentially by providing indicators of the changing available functionalities.

Further description of orientation specific control concepts will now be provided relative to FIGS. 2A through 5C, which collectively illustrate example devices 100A, 100B, and 100C. As noted above, like reference numbers in FIGS. 2A through 5C are used wherever feasible to indicate like elements introduced in FIGS. 1A through 1C. For example, first portion 102 in FIG. 1A can be viewed as similar to first portion 102A in FIG. 2A, and first portion 102B in FIG. 4A. For sake of brevity, not all like elements shown in FIGS. 2A through 5C will be reintroduced in the text.

Figure 2A:
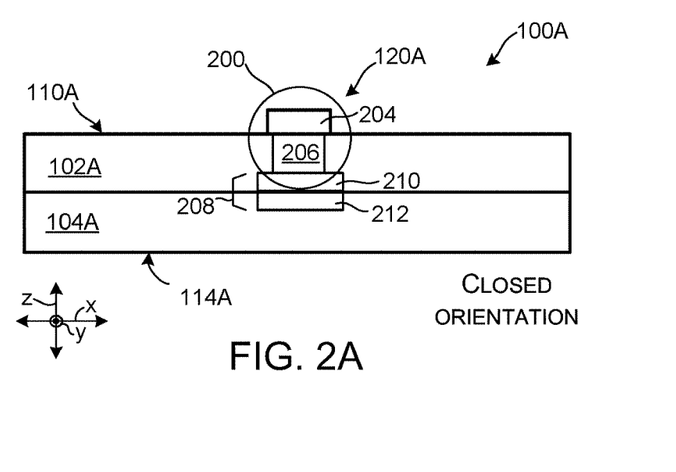
Figure 2B:
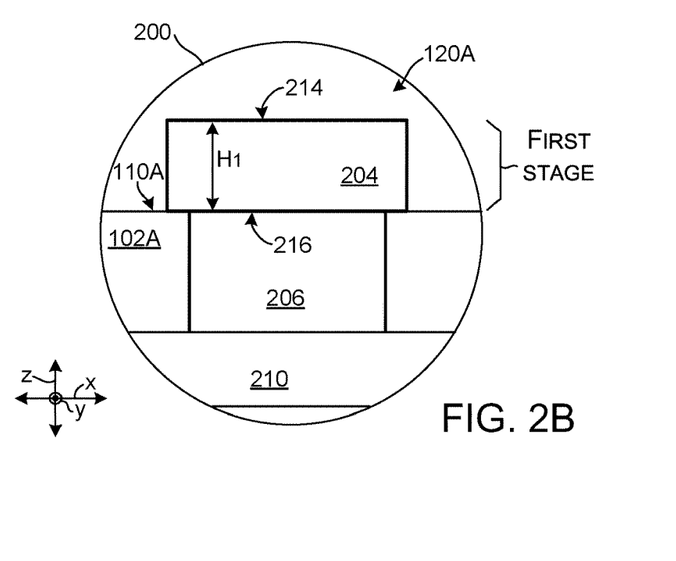
Figure 3A:
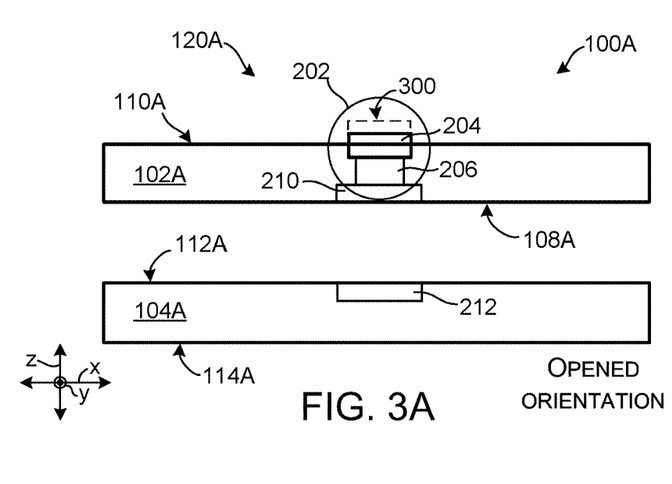
Figure 3B:
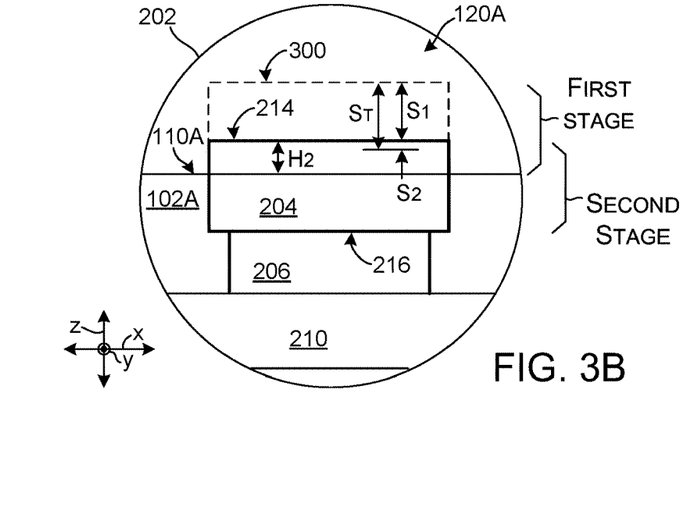

Since the reader may have difficulty visualizing all of the components of device 100A from a single view, additional views are offered concurrently. FIG. 2A is a sectional view of device 100A in the closed orientation. FIG. 2B is a close-up, sectional view of portion 200 of FIG. 2A. FIG. 3A is a sectional view of device 100A in the opened orientation. FIG. 3B is a close-up, sectional view of portion 202 of FIG. 3A.

As shown in FIGS. 2A and 2B, device 100A includes orientation specific actuator 120A. In this implementation, orientation specific actuator 120A can include a button 204, an interface element 206, and a controlling assembly 208. In this case, the controlling assembly 208 can include two portions, first securing element 210 and second securing element 212. As designated in FIG. 2B, the button 204 can have an upper surface 214 and a lower surface 216.

As introduced above relative to FIGS. 1A through 1C, the orientation specific actuator 120 can include tactile indicators of the first and second stages, such as height differences. Referring to FIG. 2B, the button 204 of the orientation specific actuator 120A can have an exposed height $H_1$ above the outer surface 110A of first portion 102A when the device 100A is in the closed orientation. In some cases the exposed height $H_1$ can correspond to a first stage of the orientation specific actuator 120A. Note that in the implementation shown in FIG. 2B, in the first stage the lower surface 216 of the button 204 is flush with the outer surface 110A of the first portion 102A and therefore the exposed height $H_1$ of the button 204 is also an overall height of the button. In other implementations, the lower surface 216 of the button 204 can be below or above the outer surface 110A of the first portion 102A in the first stage, such that an exposed height is not necessarily the same as the overall height of the button 204.

As shown in FIG. 3A, first and second portions 102A and 104A of device 100A are apart, in the opened orientation. In this instance, the button 204 can have a different exposed height, corresponding to a second stage of the orientation specific actuator 120A. For example, in the first stage, the button 204 of the orientation specific actuator 120A can be more proud of the first portion 102A (e.g., more exposed above the outer surface 110A of the first portion 102A) than in the second stage. In the second stage, the button 204 can have a height $H_2$ above the outer surface 110A of the first portion 102A (FIG. 3B). In this case, the lower surface 216 of the button 204 is depressed into the first portion 102A. To assist in showing the difference, in FIGS. 3A and 3B the more proud position of the button 204 is designated with dashed line 300.

In the first stage, a range of motion of button 204 can be viewed as a total stroke $S_T$, shown in FIG. 3B. The total stroke can be an amount that the button can be depressed by a user, such as introduced above relative to FIG. 1B. In some implementations, the total stroke can be a combination of a first stroke $S_1$ and a second stroke $S_2$. In the case illustrated in FIG. 3B, the first stroke is the distance between the more proud position of the button 204 and the upper surface 214 of the button 204 in the second stage. The second stroke can be an additional amount the button can be depressed beyond the first stroke. The second stroke can also be a reduced range of motion of the button when starting from the second stage (e.g., the opened orientation).

In some cases, the heights of the more proud and less proud positions of the button 204 can be selected to enhance tactile feedback to a user, such as user 116 depicted in FIG. 1B. The heights can also be selected to minimize a protrusion of the button to avoid snagging or undue wearing of the button. In some implementations, a difference between height $H_1$ and height $H_2$ can be detectable by feel with a thumb or finger of a user (FIG. 1B). For instance, height $H_1$ can be 1.0 millimeter (mm) and height $H_2$ can be 0.35 mm, such that the first stroke $S_1$ is 0.65 mm. In some cases, the second stroke can be 0.15 mm, such that the total stroke $S_T$ is 0.80 mm. Other amounts or ranges are contemplated for button heights and/or strokes associated with the first and second stages of the orientation specific actuator 120A.

In some cases, in response to the first stroke $S_1$, the orientation specific actuator 120A can automatically transition to the second stage and the button 204 can remain at height $H_2$. The orientation specific actuator can also automatically return to the first stage, with the button in the more proud position, in response to the device being closed. In response to the second stroke $S_2$ in the second stage, the orientation specific actuator 120A can rebound to height $H_2$, remaining in the second stage. Other reactions of the orientation specific actuator to the strokes are contemplated.

Depending on whether device 100A is in the closed or opened orientation, button 204, interface element 206, and/or controlling assembly 208 of orientation specific actuator 120A can provide the first functionality and/or the second functionality described above relative to FIGS. 1A through 1C. For instance, in FIGS. 2A through 3B, engagement of orientation specific actuator 120A in the first stage with the first stroke $S_1$ can cause controlling assembly 208 to release first and second portions 102A and 104A to the opened position. In this instance, first and second securing elements 210 and 212 can include portions of a lock, and the first stroke can cause the first and second securing elements 210 and 212 to unlock. In another instance, first and second securing elements 210 and 212 can include magnets, and the first stroke can cause the magnets to release the first and second portions 102A and 104A to the opened position. In either of these instances, the button 204 can directly interact with the controlling assembly 208, or interact indirectly via the interface element 206. Further engagement of the orientation specific actuator 120A with the second stroke $S_2$ could cause the device to power up via interface element 206. For example, the interface element 206 can include a switch (e.g., a power switch). In other implementations, the controlling assembly 208 can include the power switch, positioned in the first and/or second portions 102A and 104A. Additional detail and examples of interaction elements and controlling assemblies will be described below relative to FIGS. 4A through 5C.

Where the device is in the opened position, such as FIGS. 3A and 3B, button 204, interface element 206, and/or controlling assembly 208 of orientation specific actuator 120A can provide the second functionality (described above relative to FIGS. 1A through 1C). For instance, engagement of orientation specific actuator 120A in the second stage with the second stroke $S_2$ could cause device 100A to power down via interface element 206.

Figure 4A:
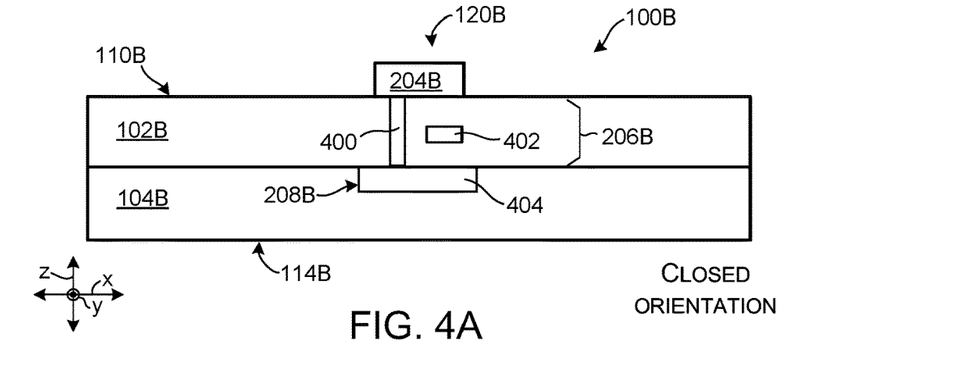
Figure 4B:
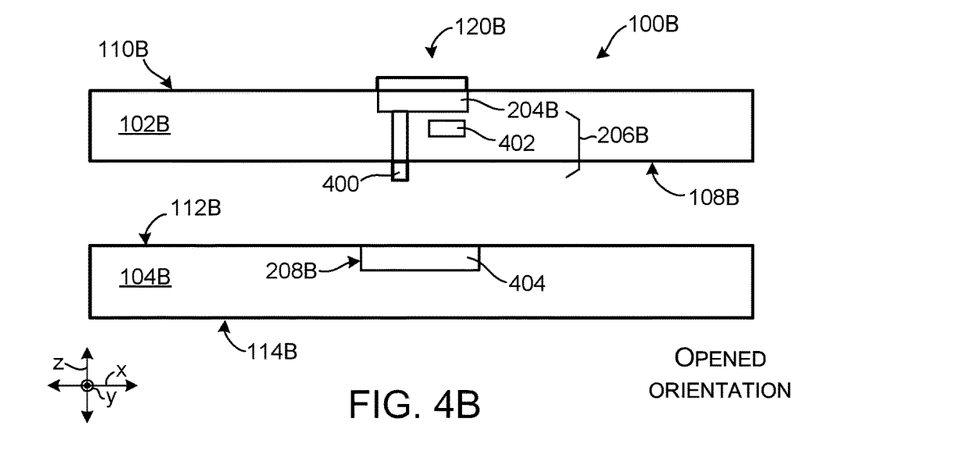
Figure 4C:
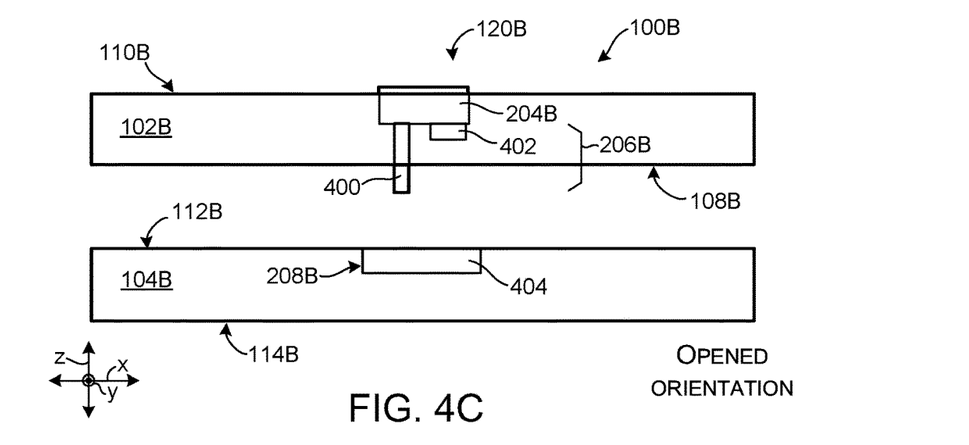

FIGS. 4A through 4C collectively describe example orientation specific control concepts relative to example device 100B. FIG. 4A is a sectional view of device 100B in the closed orientation. FIGS. 4B and 4C are sectional views of device 100B in the opened orientation. In this case, device 100B includes orientation specific actuator 120B. Orientation specific actuator 120B can include button 204B, interface element 206B, and controlling assembly 208B. Interface element 206B can include first interaction element 400 and second interaction element 402. In this example, controlling assembly 208B can be manifest as a single securing element 404. A range of motion of orientation specific actuator 120B can include a first stroke and a second stroke, similar to orientation specific actuator 120A shown in FIGS. 2A through 3B. However, the heights and strokes of orientation specific actuator 120B are not designated in FIGS. 4A through 4C to avoid clutter on the drawing page.

In this case, first interaction element 400 can be a rigid rod affixed to the button 204B and passing through the first portion 102B. Starting with FIG. 4A with the orientation specific actuator 120B in the first stage, downward movement (e.g., the first stroke) of the button 204B can simply push the first interaction element 400 downward against the second portion 104B and/or the securing element 404, opening the device to the orientation shown in FIG. 4B. For instance, the securing element 404 can be a magnet, and the first interaction element 400 can push the magnet away from the inner surface 108B of the first portion 102B, overcoming the magnetic attractive force and releasing the first and second portions 102B and 104B to the opened orientation. With continued downward movement (e.g., the second stroke), the button 204B can contact the second interaction element 402 as shown in FIG. 4C. In some cases, the second interaction element 402 can include a switch which can cause the device 100B to be powered up. As such, the total stroke of the orientation specific actuator 120B from the closed orientation can provide both mechanical functionality (e.g., opening the device) as well as electrical functionality (e.g., powering up the device).

In this case, the rigid rod (e.g., 400) and the switch (e.g., 402) are examples of mechanical elements for providing the mechanical and electrical aspects of the first functionality from the closed orientation. For example, the rigid rod is an example of a mechanical release for opening the device 100B. Additional examples of mechanical elements for providing mechanical and/or electrical functionality can include magnets, levers, springs, clasps, cams, and/or slides, used singly or in combination.

Figure 5A:
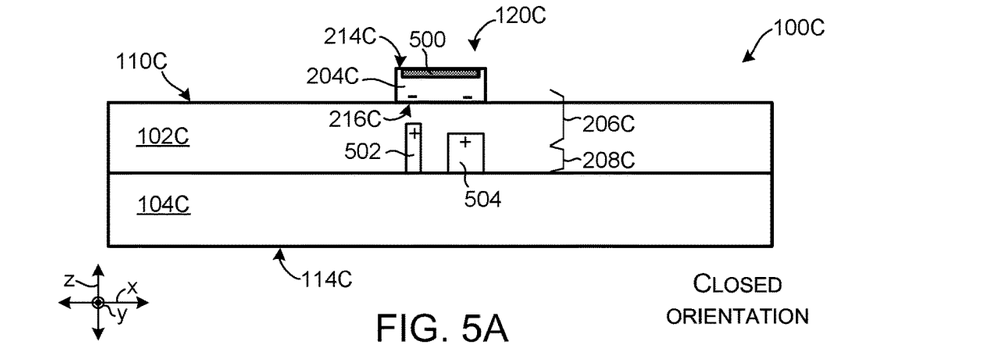
Figure 5B:
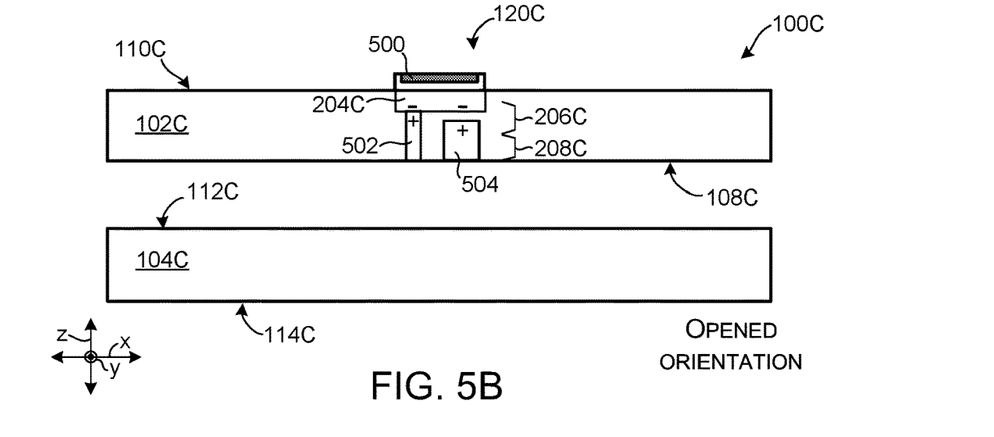
Figure 5C:
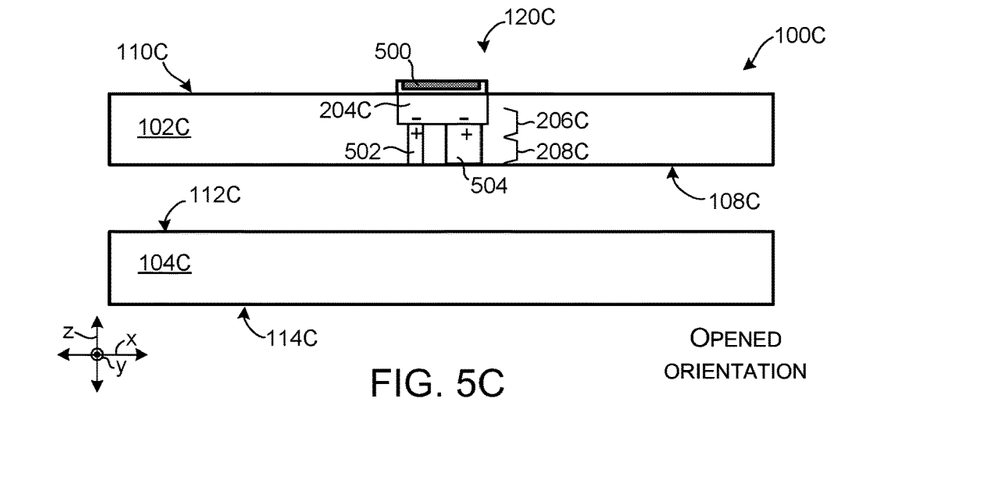

FIGS. 5A through 5C collectively describe example orientation specific control concepts relative to example device 100C. FIG. 5A is a sectional view of device 100C in the closed orientation, while FIGS. 5B and 5C are sectional views of device 100C in the opened orientation. In this case, device 100C includes orientation specific actuator 120C. The orientation specific actuator 120C can include button 204C, interface element 206C, controlling assembly 208C. In this example button 204C includes engagement element 500.

As shown in the example in FIG. 5A, controlling assembly 208C can include first conductor 502 and second conductor 504. In this case, the interface element 206C is manifest as contact electrodes indicated by "−" signs that are embedded in the button 204C and contact electrodes indicated by "+" signs that are embedded in first and second conductors 502 and 504. The polarity of the contact electrodes is not meant to be limiting. Additional circuitry can be included, but is not described for sake of brevity.

The engagement element 500, shown in FIG. 5A embedded in upper surface 214C of the button 204C, can include a finger/thumbprint reader. For example, similar to the scenario depicted in FIG. 1B, if a user touches the button 204C, the engagement element 500 can provide finger/thumbprint identification as discussed above. In other implementations, engagement element 500 can alternatively or additionally be manifest as a capacitive touch mechanism for a capacitive touch button. The capacitive touch mechanism can allow the user to engage the orientation specific actuator 120C without physically depressing the button 204C.

In this case, downward movement of the button 204C can result in contact between lower surface 216C of the button 204C and the first conductor 502 (e.g., contact of leftmost contact electrodes shown in FIG. 5A). The contact can complete a circuit between the contact electrode embedded in the lower surface 216C of the button 204C and the corresponding contact electrode embedded in the first conductor 502. Completing the circuit can cause controlling assembly 208C to open device 100C to the opened orientation, shown in FIG. 5B. For instance, the first conductor 502 can include a lock that is unlocked when the circuit is completed. In some cases, completion of the circuit and/or opening of the device 100C by the controlling assembly 208C can be contingent on successful finger/thumbprint identification via engagement element 500. In other cases, downward movement of the button 204C may be prevented without successful finger/thumbprint identification. Continuing with the example shown in FIG. 5B, further downward movement of the button 204C can result in contact between another contact electrode on the lower surface 216C of the button 204C and another corresponding contact electrode in the upper portion of the second conductor 504 (e.g., the rightmost contact electrodes) as shown in FIG. 5C, completing another circuit which can cause device 100C to power up.

Note that the first conductor 502 can include a spring (not shown) which can be compressed by the continued downward movement of the button 204C, allowing the button 204C to extend downward to the second conductor 504. In some cases, the spring can assist the button 204C in rebounding to the second stage position shown in FIG. 5B. In other cases, other elements (e.g., magnets) can be used to retain the orientation specific actuator 120C in a position associated with the opened orientation and/or the second stage.

In this case, the interface element 206C, controlling assembly 208C, and engagement element 500 are examples of electrical elements for accomplishing the electrical functionality available in the closed orientation. Other examples of electrical elements are contemplated.

Individual elements of the orientation specific actuators, including the buttons, interface elements, and controlling assemblies, and/or other components of the example devices described above can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, or any combination of these materials and/or preparations can be employed.

The present orientation specific control concepts can be utilized with any type of device, such as but not limited to notebook computers, smart phones, wearable smart devices, tablets, and/or other types of existing, developing, and/or yet to be developed devices.

Various methods of manufacture, assembly, and/or use for orientation specific actuators and related components are contemplated beyond those shown above relative to FIGS. 1A-5C.

Various device examples are described above. Additional examples are described below. One example includes a device comprising a first portion and a second portion rotatably secured via a hinge assembly such that the device is in a closed orientation where inner surfaces of the first and second portions overlay one another and such that the device is in an opened orientation where the first portion and the second portion are rotated such that the inner surfaces are apart. The device further comprises an orientation specific actuator positioned on the first portion at a first stage corresponding to a more proud position with the device in the closed orientation and a second stage corresponding to a less proud position with the device in the opened orientation. The orientation specific actuator having a first stroke associated with a first functionality and a second stroke associated with a second functionality, the first and second strokes being accessible with the device in the closed orientation and the second stroke being accessible with the device in the opened orientation.

Another example can include any of the above and/or below examples where the first functionality comprises causing the device to open in response to engagement of the orientation specific actuator with the first stroke.

Another example can include any of the above and/or below examples where the device further comprises securing elements that cause the first and second portions to be released from the closed orientation responsive to the first stroke.

Another example can include any of the above and/or below examples where the second functionality comprises powering up the device or powering down the device based at least in part on a current power state of the device in response to engagement of the orientation specific actuator with the second stroke.

Another example can include any of the above and/or below examples where the device further comprises a power switch positioned in the second portion that causes the device to be powered up or powered down responsive to the second stroke.

Another example can include any of the above and/or below examples where opening the device causes the orientation specific actuator to automatically lower from the first stage to the second stage.

Another example can include any of the above and/or below examples where the device further comprises magnets that retain the orientation specific actuator at the second stage where the device is at the opened orientation.

Another example can include any of the above and/or below examples where the orientation specific actuator functions as a power, sleep, wake function button at the second stage.

Another example can include any of the above and/or below examples where a combination of the first stroke and the second stroke corresponds to an amount a user is able to depress the orientation specific actuator where the device is in the closed orientation.

Another example can include any of the above and/or below examples where a height of the orientation specific actuator above a surface of the first portion is greater than the combination of the first stroke and the second stroke.

Another example can include any of the above and/or below examples where a range of functionality provided by the orientation specific actuator changes depending on a current orientation of the device, the current orientation including the opened and closed orientations.

Another example includes a device comprising a first portion and a second portion rotatably secured via a hinge assembly between opened and closed orientations. The device further comprises an orientation specific actuator positioned on the first portion, the orientation specific actuator having a first stage corresponding to a first functionality at the closed orientation and a second stage corresponding to a second functionality at the opened orientation.

Another example can include any of the above and/or below examples where the second functionality is a subset of the first functionality.

Another example can include any of the above and/or below examples where the second functionality is different than the first functionality.

Another example can include any of the above and/or below examples where the functionality provided by the orientation specific actuator automatically changes as the device transitions between the opened and closed orientations.

Another example includes a device comprising a first portion and a second portion and a hinge assembly configured to rotate the first and second portions between opened and closed orientations. The device further comprises an orientation specific actuator positioned on the first portion, comprising an interface element configured to, responsive to engagement of the orientation specific actuator, cause the device to power up or power down based at least in part on a current state of the device and a controlling assembly configured to cause the device to open responsive to the engagement of the orientation specific actuator where the device is in the closed orientation.

Another example can include any of the above and/or below examples where the controlling assembly comprises a magnet, and wherein the engagement of the orientation specific actuator where the device is in the closed orientation causes the magnet to release the first and second portion of the device to the opened orientation.

Another example can include any of the above and/or below examples where the interface element comprises a switch, and wherein the engagement of the orientation specific actuator activates the switch.

Another example can include any of the above and/or below examples where at least one component of the orientation specific actuator is positioned on the second portion.

Another example can include any of the above and/or below examples where the interface element comprises multiple interface elements.

Although techniques, methods, devices, systems, etc., pertaining to orientation specific control are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
a first portion and a second portion rotatably secured via a hinge assembly such that the device is in a closed orientation where inner surfaces of the first and second portions overlay one another and such that the device is in an opened orientation where the first portion and the second portion are rotated such that the inner surfaces are apart; and,
an orientation specific actuator positioned on the first portion, the orientation specific actuator having a first stage in the closed orientation where the orientation specific actuator has a more proud position above an external surface of the first portion of the device, wherein the orientation specific actuator is movable to a second stage in the opened orientation where the orientation specific actuator has a less proud position above the external surface of the first portion of the device, the orientation specific actuator having a first stroke associated with a first functionality and a second stroke associated with a second functionality, the first and second strokes being accessible with the device in the closed orientation and the second stroke being accessible with the device in the opened orientation.

2. The device of claim 1, wherein the first functionality comprises causing the device to open in response to engagement of the orientation specific actuator with the first stroke.

3. The device of claim 1, further comprising securing elements that cause the first and second portions to be released from the closed orientation responsive to the first stroke.

4. The device of claim 1, wherein the second functionality comprises powering up the device or powering down the device based at least in part on a current power state of the device in response to engagement of the orientation specific actuator with the second stroke.

5. The device of claim 1, further comprising a power switch positioned in the first portion or positioned in the second portion that causes the device to be powered up or powered down responsive to the second stroke.

6. The device of claim 1, wherein opening the device causes the orientation specific actuator to automatically lower from the first stage to the second stage.

7. The device of claim 6, further comprising magnets that retain the orientation specific actuator at the second stage where the device is at the opened orientation.

8. The device of claim 1, wherein the orientation specific actuator functions as a power, sleep, wake function button at the second stage.

9. The device of claim 1, wherein a combination of the first stroke and the second stroke corresponds to an amount a user is able to depress the orientation specific actuator where the device is in the closed orientation.

10. The device of claim 9, wherein a height of the orientation specific actuator above a surface of the first portion is greater than the combination of the first stroke and the second stroke.

11. The device of claim 1, wherein a range of functionality provided by the orientation specific actuator changes depending on a current orientation of the device, the current orientation including the opened and closed orientations.

12. A device, comprising:
a first portion and a second portion rotatably secured via a hinge assembly between opened and closed orientations; and,
an orientation specific actuator positioned on the first portion, the orientation specific actuator having a first stage corresponding to a first functionality when the orientation specific actuator is depressed a first stroke distance while the device is in the closed orientation and the orientation specific actuator having a second stage corresponding to a second functionality when the orientation specific actuator is depressed a second stroke distance, different than the first stroke distance, while the device is in the opened orientation.

13. The device of claim 12, wherein the second functionality is a subset of the first functionality.

14. The device of claim 12, wherein the second functionality is different than the first functionality.

15. The device of claim 12, wherein the functionality provided by the orientation specific actuator automatically changes as the device transitions between the opened and closed orientations.

16. A device, comprising:
a first portion and a second portion;
a hinge assembly configured to rotate the first and second portions between opened and closed orientations; and,
an orientation specific actuator positioned on the first portion, comprising:
an interface element configured to, responsive to engagement of the orientation specific actuator, cause the device to power up or power down based at least in part on a current state of the device, and
a controlling assembly configured to cause the device to open responsive to the engagement of the orientation specific actuator where the device is in the closed orientation.

17. The device of claim 16, wherein the controlling assembly comprises a magnet, and wherein the engagement of the orientation specific actuator where the device is in the closed orientation causes the magnet to release the first and second portion of the device to the opened orientation.

18. The device of claim 16, wherein the interface element comprises a switch, and wherein the engagement of the orientation specific actuator activates the switch.

19. The device of claim 16, wherein at least one component of the orientation specific actuator is positioned on the second portion.

20. The device of claim 16, wherein the interface element comprises multiple interface elements.

* * * * *